United States Patent [19]

Mortensen et al.

[11] 4,099,940
[45] Jul. 11, 1978

[54] IMPULSE FILTER CLEANER

[75] Inventors: Donald G. Mortensen, San Jose; Dennis P. Strand, Modesto, both of Calif.

[73] Assignee: FMC Corporation, San Jose, Calif.

[21] Appl. No.: 778,633

[22] Filed: Mar. 17, 1977

[51] Int. Cl.$^2$ .......................................... B01D 41/04
[52] U.S. Cl. .................................... 55/300; 55/112; 55/304
[58] Field of Search ................. 55/13, 112, 300, 304; 210/79, 387, 407; 173/100, 101

[56] References Cited

U.S. PATENT DOCUMENTS

| | | | |
|---|---|---|---|
| 2,167,236 | 7/1939 | Gieseler | 55/304 |
| 2,364,420 | 12/1944 | Bloss | 173/100 |
| 2,463,435 | 3/1949 | Smellie | 55/304 |
| 2,721,971 | 10/1955 | Francois | 173/100 |
| 3,160,908 | 12/1954 | Peabody et al. | 55/300 |
| 4,007,026 | 2/1977 | Groth | 55/302 |

FOREIGN PATENT DOCUMENTS

| | | | |
|---|---|---|---|
| 6,991 | 11/1901 | Fed. Rep. of Germany | 55/300 |
| 286,975 | 11/1971 | U.S.S.R. | 55/112 |

*Primary Examiner*—Frank W. Lutter
*Assistant Examiner*—David L. Lacey
*Attorney, Agent, or Firm*—J. F. Verhoeven

[57] ABSTRACT

A resiliently supported filter support plate, with tubular filters depending therefrom, is provided with an overlying rock shaft carrying rocker arms having depending hammer heads arranged to strike and jar the filter mounting plate to shake off the filter cake. A resilient crank arm is connected to the rock shaft and is provided with parallel, cantilever mounted leaf springs that receive an eccentric drive roller which oscillates the rock shaft through one or the other of the leaf springs and causes the hammer heads to strike the filter support plate before the striking stroke of the roller has been completed. The driven leaf spring is then deflected by the roller as it completes its striking stroke, further motion of the hammer heads having been interrupted by the filter support plate. On the hammer lift stroke the eccentric roller retracts the hammer via the other leaf spring. Two embodiments are shown; a dual hammer form with hammers projecting in opposite directions from the rock shaft and a single hammer form wherein a single row of banners project in one direction from the rock shaft.

10 Claims, 7 Drawing Figures

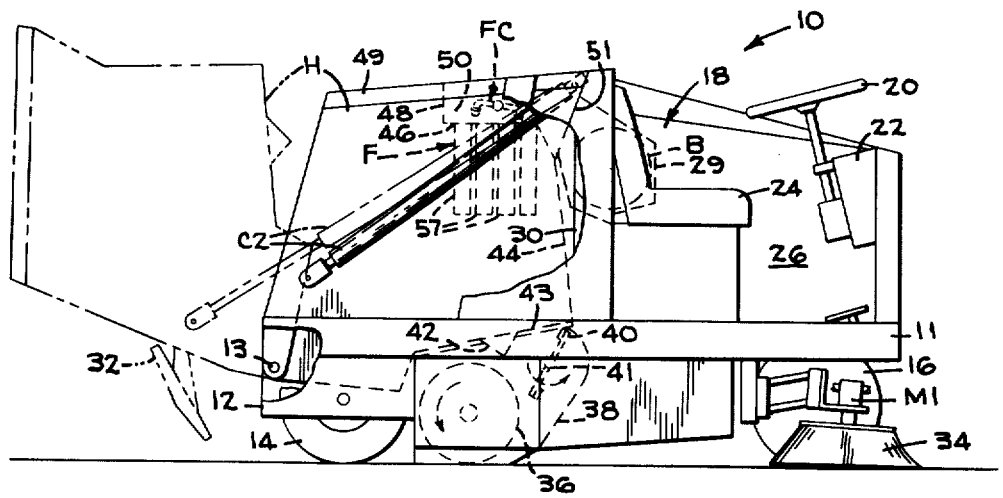
FIG_1
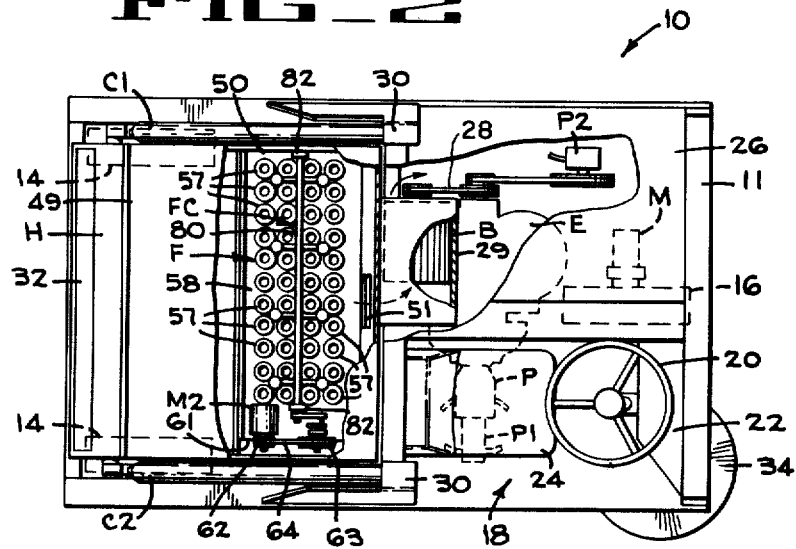
FIG_2

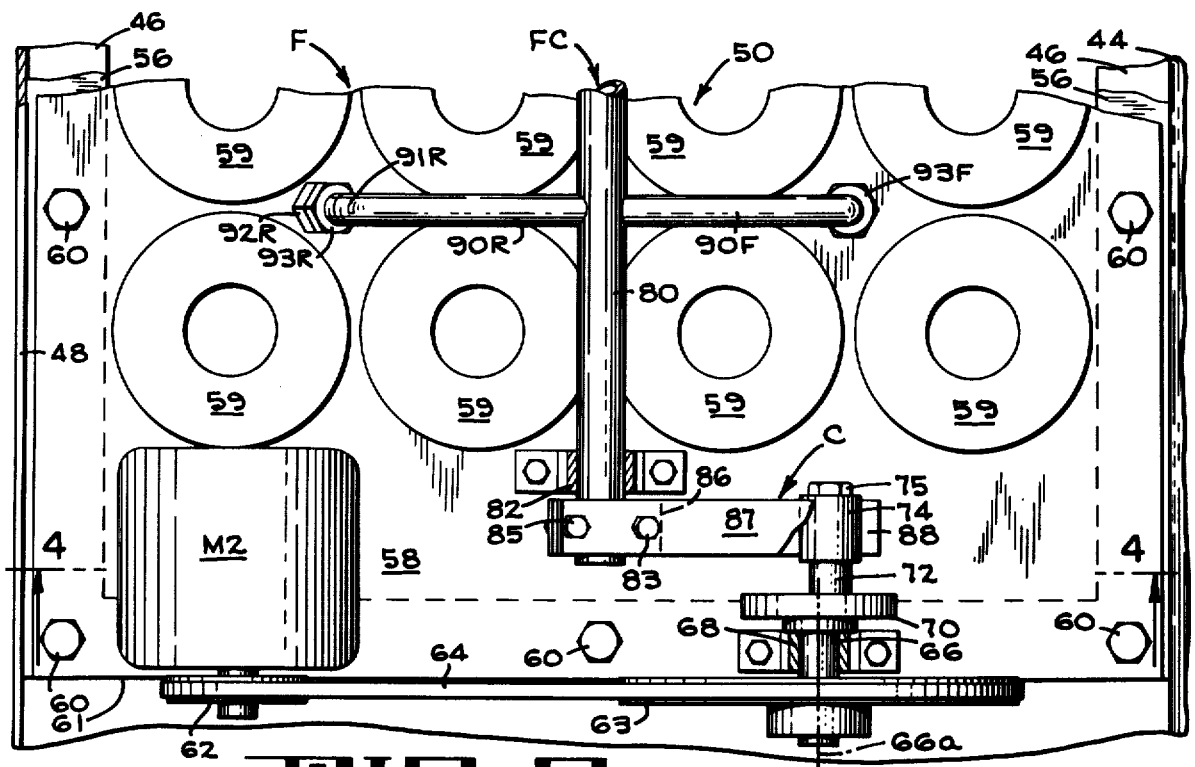
FIG_3
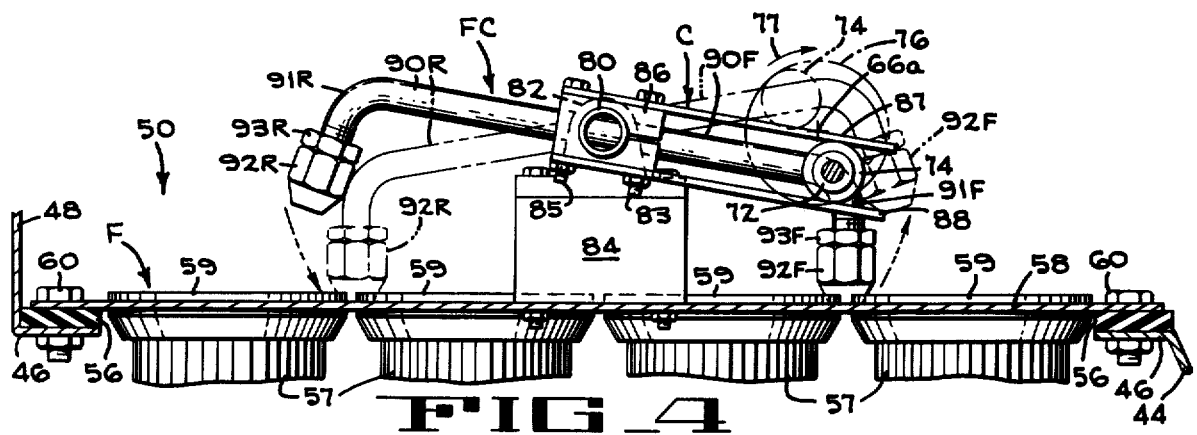
FIG_4
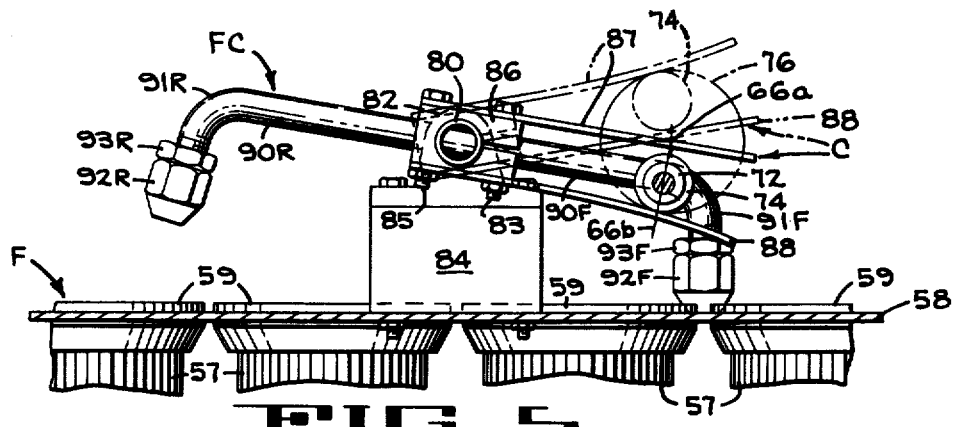
FIG_5

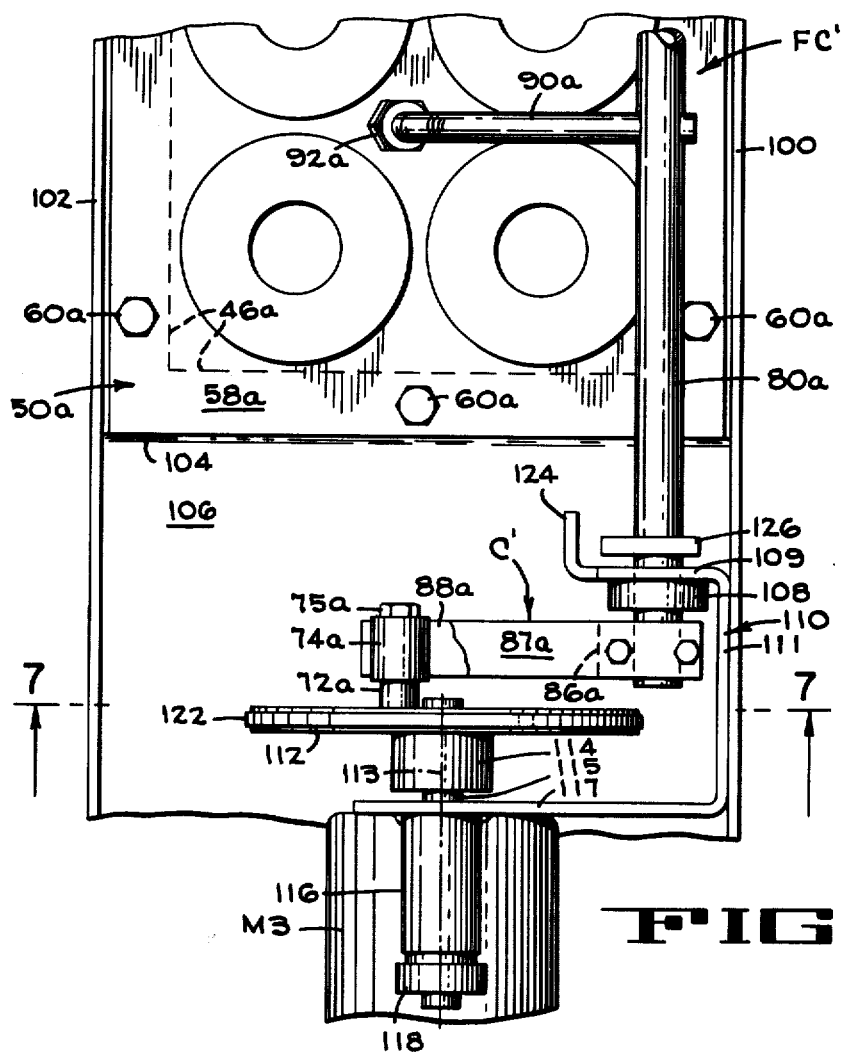
FIG_6
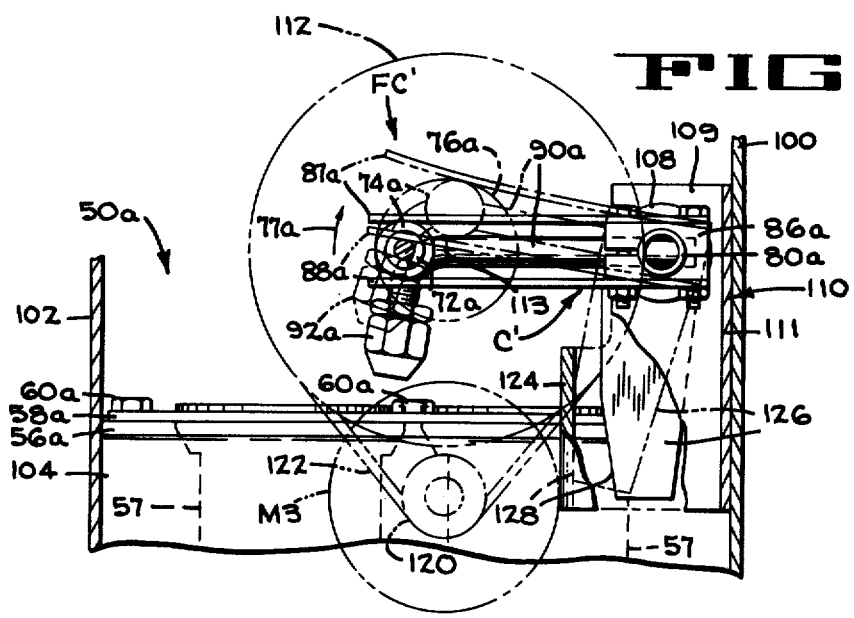
FIG_7

4,099,940

1

IMPULSE FILTER CLEANER

FIELD OF THE INVENTION

The field of the present invention concerns filter systems for dust laden air, and more specifically relates to filter cleaning apparatus for mechanically dislodging dust and dirt particles from the filters.

BRIEF DESCRIPTION OF PRIOR ART

The Groh patent application, Ser. No. 604,275, filed Aug. 13, 1975 and commonly assigned to the FMC Corporation discloses a compact filter installation wherein a bank of tubular pleated filter elements depend from a support plate and their bottom ends are closed by a cap. In order to clean the filter elements, air pulse jets are periodically directed into their interior to dislodge dust and dirt particles adhering to their outer surfaces.

Clark Ser. No. 802,974, Oct. 31, 1905 discloses a rotary dust collector having a turret from which extends a series of spokelike spring mounted filter support bars. A single hammer 66 having a head 67 with a striking cushion 68 formed of rubber is pivotally mounted on a shaft 34, which has functions not related to operation of the hammer. The hammer itself is raised and dropped by a toothed cam 71 shown in FIG. 6, which lifts teeth 70 projecting down from the arm of the hammer, close to its pivot point. Thus, the rapping action is solely due to fall of the hammer under the force of gravity. Means are provided to rotate the spoke-like filter assembly to successively bring the various spring mounted filter bars 32 under the hammer, as seen in FIG. 2.

Merrell Ser. No. 985,747, Feb. 28, 1911 discloses filter elements 2, supported from plates 9 which are rapped by a mallet 15 mounted at one end of a pivoted lever of the first class. The rotating lever cam 16 raises the mallet and allows it to drop on the filter supporting plate 9. It appears that there might be a leaf spring urging the mallet toward the filter support plate, but no such spring is described or numbered.

Warren U.S. Pat. No. 1,268,304, June 4, 1918 discloses a filter construction resembling that of the aforesaid Merrell patent, except that the cam 26 operates each pivoted hammer arm 19 as a lever of the second class having a weight 35 and a striker 24 for imparting impacts to a filter supporting cross bar 21. The two oppositely extending hammer arms are operated by the same cam and the filter supporting cross bars 21 are insulated from the strikers 24 by sound deadening leather straps 23.

Kling et al U.S. Pat No. 1,395,833, Nov. 1, 1921 discloses filter elements suspended from a lower support 8a connected by a yoke 9 to an upper support frame 8. The filter support is jarred to shake out an accumulation of dust by a hammer 5 on a reciprocating rod 6. The mode of reciprocating the rod 6 is referred to as being shown in an abandoned application filed in 1921.

Fatscher U.S. Pat. No. 1,496,666, June 3, 1924 shows filter bags 26 which are spring suspended from the housing by crossbars 36. When it is desired to clean the bags the exhaust fan is stopped and air under pressure reciprocates a slug in an impact device which imparts hammer blows alternately to the opposite ends of a casing 39, as in the U.S. Pat. to Pickop No. 1,336,921. The latter patent discloses a vibrator that employs an air oscillated piston 14 enclosed in a cylinder.

2

Clasen et al U.S. Pat. No. 1,784,339, Dec. 9, 1930 shows groups of tubular filters suspended from a horizontal rod 21 which is in turn suspended from a vertical rod 21' that is supported by an oscillating lever 26 pivoted at 25. A cam structure causes intermittent oscillation of the lever 26 to vertically shake the filters for cleaning.

Peabody et al U.S. Pat. No. 3,160,908, Dec. 15, 1964, shows means for shaking the lower hanging bars of a draped filter element. As seen in FIGS. 6 and 7 (for example), a manually rotated shaft 159 carries offset vanes 162 which strike the lower filter stretching bars 147 at a location wherein the filter material has been cut out to expose the bars.

Pranovi U.S. Pat. No. 3,326,383, June 20, 1967 discloses a device for cleaning a solvent filter in a garment cleaning machine. The upper end of a filter 37 is supported on a vertical valve rod 22 by a spring system. Magnet armatures 29 and 30 on the valve rod are normally held above the electromagnets 31, 32 by an upper spring 34. When the electromagnets are energized, the armatures are forcibly brought against the electromagnets which imparts a blow to the filter and simultaneously opens the lower valve 20 for discharge of the material that has been jarred loose.

McCandless U.S. Pat. No. 3,484,889, Dec. 23, 1969 discloses a draped filter assembly having side frames 48 that mount depending yokes 72. The yokes can be manually raised and lowered by the operator through a lever 86, during which operation the filter frame falls back onto flanges 44, 46.

Steuernagel U.S. Pat. No. 3,570,217, Mar. 16, 1971, discloses a cam operated, free swinging hammer 5 which is lifted by a cam 6 and allowed to fall by gravity. On one stroke the hammer falls against a vertical anvil face 1a on a frame 2 which carries electrostatic reciprocator electrodes (not shown) and this imparts a horizontal vibration to the frame. On the other stroke the hammer falls on an inclined anvil face 1b which imparts a 45° shaking motion to the frame.

Tamny U.S. Pat. No. 3,587,213, June 28, 1971 discloses a bank of cantilevered pleated air filters 14, the free ends of which are connected to a hydraulically driven eccentric mechanism 28 which is horizontally disposed to laterally shake the free ends of the filters via a shaker bar 25.

Davis U.S. Pat. No. 3,651,621, Mar. 28, 1972, discloses filters 64 which depend from a spring suspended mounting plate 61. A vibrating mechanism 72, the details of which are not disclosed, either continuously or intermittently shakes the filter bags 64 suspended from the plate 61 for cleaning the filters.

Oberdank U.S. Pat. No. 3,847,576, Nov. 12, 1974 discloses filters 14 supported from a resiliently mounted air manifold 13 and a fixed shaft 16 which is parallel to the manifold. An eccentric weight 24 is rotated by a motor 27 that is mounted on the manifold, thus shaking the manifold and pivoting the filters about the shaft 16. A jarring force is imparted to the pivotable filters by a rigid arm 31 that vibrates with the manifold and impacts fixed stop members 32.

In McClure U.S. Pat. No. 3,938,971, Feb. 17, 1976, the upper ends of filters 28 are suspended from a tube sheet 22 by bellows 26 and coil springs 48. Upper and lower stops or armatures 38, 40 are connected to the upper and lower ends of each filter. Upper and lower electromagnets 34, 36 are cyclically energized by a control 52 to alternately raise and lower the filter rod to impart jars to the filter elements for cleaning.

SUMMARY OF THE INVENTION

A filter cleaning system embodying the invention is described and disclosed in conjunction with a compact self-powered riding type of industrial sweeper, but the system is useful with any dust filtering system employing tubular filters which are end-mounted in a common support plate, and is most efficient when the filters are axially rigid, such as resin impregnated porous filters that are longitudinally pleated. The latter type of filter forms the subject matter of the aforesaid copending patent application of Groh, Ser. No. 604,275, filed Aug. 13, 1975.

The apparatus for cleaning the dust filters is of the type comprising frame structure including a resiliently mounted filler support, dust filters depending from the support, means for pivotally mounting a rocker arm on the frame structure, a hammer head at the end of the rocker arm and means for operating the rocker arm to cause the hammer head to strike the filter support. The aforesaid apparatus is generally known in the art, and the improvement therein is one wherein the operating means for the rocker arm comprises resilient crank arm means having one end portion connected to the rocker arm for oscillating the arm about its pivot. The operating means also includes oscillating means having a predetermined stroke and engaging the other end portion of the resilient crank arm means and means for driving the oscillating means. In accordance with the present invention, motion of the oscillating means in one direction acts on the resilient crank arm means to cause the hammer head to strike the frame support with the complete stroke of the oscillating means in that direction exceeding the stroke motion of the oscillating means required to cause the hammer head to strike the support. As a result the striking force imparted by the oscillating means continues right up to the time of strike, thereby mechanically providing a sharp forceful rap or blow to the support for shaking dust loose from its depending filters. In accordance with the present invention the resilient crank arm means is deflected during the terminal portion of the complete stroke of the oscillating means thereby accomodating completion of the stroke while the motion of the hammer head remains interrupted by the filter support. The stroke of the oscillating means in the opposite direction retracts the hammer head from the support.

In the embodiment illustrated, a resilient rubber-like supporting and sealing gasket underlies the marginal portions of a horizontal filter mounting plate and rests upon a fixed frame flange which lies between a blower exhaust housing and the interior of the dirt collection hopper. Thus mounted, the filter mounting plate and the banks of depending filters can be vertically displaced relative to the frame by deformation of the resilient supporting and sealing gasket plus the inherent resiliency of the filter mounting plate. As to the hammer head mounting, each rocker arm projects from a rock shaft which extends over the filter mounting plate and mounts the aforesaid resilient crank arm as well as a series of spaced rocker arms. Each rocker arm has a downturned, vertically adjustable hammer head which strikes the filter mounting plate to deliver a succession of rapid downward raps or blows. The combined vertical downward acceleration of the filters from the hammer blows and the rebound or upward acceleration of the filter support plate in the reverse direction, caused by restoration, of the previously deformed resilient support gasket, is suddenly arrested by means such as the heads of mounting bolts, thereby providing a second rap or jar to the filters which contributes to the dislodging of dirt particles adhering to the filters.

In one embodiment of the invention, a double row of rocker arms project from opposite sides of the rock shaft, and in another a single row of rocker arms project from one side of the rock shaft. In the preferred form of both embodiments of the invention, the resilient crank arm for operating the hammer rocker arms comprises a pair of spaced leaf springs which are mounted on the rock shaft at their inner ends. In order to oscillate the crank arm a rotating shaft is provided which carries an eccentrically mounted roller. This roller rides between the crank arm leaf springs and causes the hammer head to strike the filter plate before completion of the striking stroke of the roller. Thus, the hammer head is mechanically brought against the filter support plate by the roller and one of the leaf springs. Also, although the support plate has interrupted further descent of the hammer, the striking stroke of the roller is continued until stroke termination, because the leaf spring is merely deflected by the roller during the terminal portion of the roller stroke. One advantage of this construction is that the hammer head is forcefully and mechanically swung against the filter support without requiring mechanical adjustments of the operating mechanism. Another advantage of the operating mechanism of the present invention is that the hammer striking force is substantially the same regardless of the stroke frequency, the striking force can be readily altered by changing the spring rate of the springs, and the frequency can easily be varied by controlling the speed of a motor which drives the eccentric roller shaft.

BRIEF DESCRIPTION OF THE DRAWINGS

FIG. 1 is a side elevation of a street sweeper embodying the present invention, and showing the hopper in a dump position in phantom outline.

FIG. 2 is a plan of the sweeper with a portion of the hopper broken away to show the filter elements and a dual hammer impulse filter cleaning mechanism of the present invention.

FIG. 3 is an enlarged fragmentary plan, partly broken away, of the impulse filter cleaning mechanism shown in FIG. 2.

FIG. 4 is a vertical section taken along lines 4 — 4 on FIG. 3 when the right row of hammer heads have just been brought against the filter support plate by the eccentric roller.

FIG. 5 is a view like FIG. 4 where the eccentric roller has completed its striking stroke and has deflected the lower leaf spring. This figure also shows in phantom the position of the roller and leaf springs when the left row of hammers strike the filter support plate.

FIG. 6 is a fragmentary plan, similar to FIG. 3, disclosing a single hammer row embodiment of the invention.

FIG. 7 is a vertical section taken along lines 7 — 7 on FIG. 6, showing the hammers being retracted in solid lines and the conditions of maximum roller retraction in phantom.

DESCRIPTION OF THE PREFERRED EMBODIMENT

With reference to FIGS. 1 and 2, and embodiment of the present invention is disclosed in conjunction with an industrial type sweeper vehicle 10 similar to that disclosed in the aforesaid Groh application. The sweeper includes a frame structure 11 and depending rear frame brackets 12 for pivotally mounting a hopper H for tilting movement about stub shafts 13. The frame brackets 12 also support freely running rear wheels 14.

The sweeper is steered by a single front wheel 16, which is driven by a hydraulic motor M. At the curb side on the forward end of the frame 11 is an operator's station 18 including a steering wheel 20, control console 22 and a seat 24. To the left of the operator is a housing 26 that encloses a transversely mounted engine E, which drives an axial flow blower B by a V belt 28, a main hydraulic pump P (FIG. 2) for the drive motor M, and auxiliary pumps P1 and P2 for mechanisms to be mentioned. The frame includes uprights 30 which mount hopper left and right tilt cylinders C1 and C2 for pivoting the hopper to the phantom line position of FIG. 1 and dumping the collected debris through a hopper door 32. The sweeper includes a gutter broom 34 mounted under the operators station 18 and driven by the pump P1. The gutter broom revolves in a direction to move the debris into the path of a cylindrical main sweeper broom 36 (FIG. 1) which extends across the vehicle in front of the rear wheels 14. Power for the brooms 34 and 36 is obtained from individual hydraulic motors, the only brush motor shown being the motor M1 (powered by the pump P1) which drives the gutter broom 34.

The main sweeper broom 36 revolves CCW (counterclockwise), as viewed in FIG. 1, to throw the debris forwardly upward within a confining housing or shroud 38, and into contact with a driven double blade paddle 40 which revolves about the axis of its mounting shaft 41. Directly above the paddle 40, forward of a V-shaped deflector 42, the hopper floor is formed with a debris and air inlet opening 43 (FIG. 1). Thus, the driven paddle, rotating in a CCW direction, thrusts the debris rearwardly into the hopper H. The blower B draws air into the interior of the hopper H through the debris inlet 43 and thence through rows of filter elements forming a filter bank F, and discharges filtered air through the pulley end of the blower housing to the atmosphere.

As later described, the present invention comprises a mechanical filter cleaning system FC (FIGS. 1 and 2) which overlies the filter bank and is arranged to forcibly jar the filters to free dust and filter cake which accumulates on the exterior surfaces of the filters.

For mounting the filter bank F, the hopper H includes a front wall 44, the upper portion of which merges with an apertured filter assembly mounting wall portion formed by circumferential flanges 46 (FIGS. 3 and 4) which are substantially horizontal when the hopper H is in loading position and which extend laterally between the side walls of the hopper. The rear flange 46 is connected to an upstanding imperforate wall 48 (FIG. 1), thus forming, in conjunction with a top hopper door 49 and associated adjacent wall portions, a filtered air exhaust chamber 50 above the filter bank F. The chamber 50 communicates with the inlet end of the blower B by an opening 51 between the filtered air chamber 50 and the blower housing 29. Further details of the sweeper vehicle 10 are illustrated and described in the aforementioned Groh patent application, Ser. No. 604,275, but these are not critical to the present invention because under its broader aspects, the utility of the present invention is not restricted to use in street sweepers.

The horizontal wall portion flanges 46 (FIGS. 3 and 4) provide a continuous rigid rectangular mounting for the filter bank F. Coextensive with and resting on the mounting flanges 46 is a resilient gasket 56 formed of rubber-like material which supports an apertured filter mounting or support plate 58. As described in the Groh patent application, supra, each filter element 57 is provided with a top grommet 59 which snaps into an aperture in the support plate 58 for installation and replacement of the filter element. Bolts 60 are provided at spaced intervals to clamp the support plate 58 and the gasket 56 to the flanges 46 with enough force to provide an air-tight seal between the interior of the hopper H (FIG. 1) and the filtered air exhaust chamber 50. However, the bolts 60 deform the gasket 56 only enough to provide an air seal, so that the gasket can be further deformed by a downward motion imparted to the support plate 58 in response to blows from filter cleaning hammers, as will be described.

The right end of the filtered air chamber 50 is provided with a vertical wall 61 (FIGS. 2 and 3) that seals with the hopper lid 49.

FILTER CLEANING SYSTEM

In the system shown, the filter elements 57 are those which are described and claimed in the aforementioned Groh application, Ser. No. 604,275, and comprise elongate tubes formed of resin impregnated porous paper which are longitudinally pleated to increase their effective filtering area. This construction, plus internal coil springs and encircling reinforcing bands, not shown, renders the filter tubes fairly rigid in the transverse direction and quite rigid in the axial direction. In the Groh application, the filters are cleaned by reverse air pulses periodically directed into the open upper end of each filter element. In the present invention, the air pulse, reverse flow cleaning system is replaced by the simple mechanical filter cleaning system. Dust adhering to the external surfaces of the filters 57 is jarred loose by the mechanically operated hammer assembly FC which in the installation shown, extends transversely of the vehicle 10 (FIG. 2) and is driven by an electric motor M2 (FIGS. 2 and 3). The assembly FC includes a motor pulley 62, a stub shaft pulley 63 and a V-belt 64 for driving a stub-shaft 66 (FIG. 3). The stub shaft 66 is mounted in a pillow block bearing 68 bolted to one edge of the filter support plate 58. A disc 70 is mounted on the inner end of stub shaft 66 and carries an eccentrically mounted stub shaft 72 having a camming roller 74 retained thereon by a bolt 75 in a manner which leaves the roller free to rotate on its stub shaft 72. When the disc 70 is rotated, the roller 74 follows a circular path 76 (FIGS. 4 and 5). This rotation of the roller can be considered to impart oscillatory, generally vertical strokes to the roller in the downward and in the upward directions. Although the disc 70 may be rotated in either direction, in the present example, as is indicated by the arrow 77 (FIG. 4), the rotation is clockwise.

Horizontally displaced from the stub shaft 66 is a tubular rock shaft 80, each end of which is rotatably mounted in a pillow block bearing 82 on a spacer block 84 that is bolted to the filter support plate 58. For converting the orbital motion of the camming roller 74 to oscillatory motion of the rock shaft 80, a resilient crank arm indicated generally at C is clamped to one end of the rock shaft 80 by a split clamping block 86 and a clamp bolt 83 (FIG. 4). Secured to the upper and lower surfaces of the clamping block 86 by the bolt 83 and a bolt 85 are upper and lower cantilever leaf springs 87,88. The spacing of the leaf springs, when unstressed, is equal to the diameter of the camming roller 74.

In order to convert oscillation of the rock shaft 80 into a hammering action, a spaced series of tubular, rearwardly projecting rocker arms 90R are welded to the rear side of the rock shaft 80, each arm having a downturned end 91R, which is externally threaded to receive a hammer head 92R and a lock nut 93R to hold the hammer head in its axially adjusted position. In similar manner, a series of forwardly projecting tubular rocker arms 90F are welded to the forward side of the rock shaft 80, with corresponding downturned ends 91F, hammer heads 92F and lock nuts 93F. As shown in FIGS. 3 and 4, each hammer head strikes the filter support plate 58 at a zone that is equally spaced from the centers of four adjacent filter elements 57. All of the hammer heads on each side of shaft 80 are adjusted so as to strike the filter mounting plate 58 simultaneously.

In accordance with the present invention, the resilient crank arm C is clamped on the rock shaft 80 by the split claming block 86 in a position such that the hammer heads 92F firmly strike the filter mounting plate 58 before the eccentric roller 74 terminates its downward or striking stroke. This raps the filter support plate 58 and jars it downwardly along with the filter elements 57, thus providing the first dust and dirt dislodging action. The striking stroke of roller 74 for the hammers 92F continues after the hammers have firmly rapped the plate 58 and does not terminate until the axis of the roller reaches a line 66b (FIG. 5) drawn through the axis 66a of the shaft 66 substantially perpendicular to the undeflected upper spring 87.

As mentioned, and as seen in FIG. 4, the hammer heads 92F strike the filter support plate 58 before the downward striking stroke of the roller 74 terminates. Once the hammer heads 92F strike the filter support plate 58 their downward motion is interrupted so that the hammer heads have been caused to strike the plate 58 forcefully and mechanically by the roller 74 acting on the lower spring 88. Continued rotation of the disc 70 (about 20°) provides the terminal portion of the striking stroke of the roller 74. During this portion of the strike, the lower spring 88 is deflected by the roller (FIG. 5) while motion of the hammer heads 92F remains uninterrupted by the filter support plate 58.

Continued rotation of the disc 70 from the position of FIG. 5 causes the roller to recede from the lower spring 88 and move upwardly toward the upper spring 87. After about 20° of such continued rotation, the roller will just engage the upper spring 87 while the lower spring 88 has sprung back and followed the roller in its initial upward motion relative to the springs. The roller will now be in a position analagous to that of FIG. 4, wherein it is lightly engaged by both springs without any substantial deflection of either spring.

Continued rotation of the disc 76 starts an upward striking stroke of the roller 74. The roller now lifts the upper spring 87, causing the shaft 80 to begin rocking in the opposite direction. This stroke of roller 74 moves the hammer heads 92R down toward the filter support plate 58 and simultaneously lifts the heads 92F from the plate. As the roller 74 continues on its upward striking stroke it reaches the position shown in phantom in FIG. 4, wherein the rear hammer heads 92R are mechanically caused to strike the plate 58 but the upper spring 87 has not been substantially deflected.

The roller 74 completes the terminal portion of its upward striking stroke when it reaches the position shown in phantom in FIG. 5. Here further motion of the hammer heads 92R (not shown in FIG. 5) has been interrupted by the plate 58 (as shown in phantom in FIG. 4) while deflection of the upper spring 87 (FIG. 5) accommodates completion of the upward striking stroke of roller 74. Thus, an important function of the leaf springs 87 and 88 is that the springs permit the roller 74 to mechanically and forcefully bring the hammer heads against the plate 58 without requiring precise, adjustment of the crank arm C on the rock shaft. However, the individual hammer heads are adjusted on their rocker arms 90F, 90R so that all of the heads in a row strike the plate 58 simultaneously. This adjustment is easily performed and does not change during operation due to frictional wear between moving parts. The aforesaid deflection or flexure of the leaf springs 87,88 when the impulse cleaner is in operation assures a continuity of the driving force, provided that the springs are stiff enough to prevent "floating" the roller 74 out of contact with the springs at the selected operating speed for the motor M2.

In one operative example, it was found that striking the plate 58 at a rate of 1200 blows per minute, 600 by each set of hammer heads would effectively clean four row banks of 44 filters in about 5 seconds or 1/12 of a minute. The springs 87,88 are made of spring steel, are about 3/4 inches wide and 1/16 inches thick and are of such a length that the spacing of shaft axis 66a from the axis of rock shaft 80 is about 2¾ inches. The axis of roller 72 is offset 9/16 inches from its shaft axis 66a. Four double rocker arms 90F,90R, as shown in FIG. 2, were employed. Since one revolution or orbit of the camming roller 74 provides two hammer head blows rotation of the driving disc 70, 600 RPM provides a desired rate of 1200 blows per minute. In other words, fifty blows are delivered by each set of hammer heads in a cleaning period of 5 seconds and this number of blows was found adequate to complete a filter cleaning operation, and the normal flow of air through the filters takes place 82% of the time. The motor M2 can be a variable speed motor, or different belting can be provided to vary the hammer blow frequency, but in the example given the aforesaid fixed drive ratio will deliver hammer blows at a frequency that provides effective filter cleaning during a short cleaning cycle. As mentioned, during the filter cleaning operation, the suction side of the blower B is preferably isolated from the filtered air chamber. 50. This is accomplished either by interrupting the operation of the blower for 5 seconds (in the present example) or by blocking off the suction inlet 51 with a shutter (not shown) because otherwise the differential pressure across the walls of the filter elements 57 would cause some of the loosened filter cakes and dust to adhere to the outsides of the filters instead of dropping into the hopper H.

Another advantage of the resilient crank arm construction relates to the resilient gasket 56 between the filter mounting plate 58 and the housing flange 46. When being forcefully rapped by the hammers, the plate 58 is momentarily moved down slightly, thereby deforming the rubber-like gasket 56. The gasket then returns to its previous thickness, lifting the plate 58 back to its original position of confinement by the bolts 60. This rebound of the plate against the heads of bolts 60 imparts additional jars to the plate and positive abutment of the plate with the bolt heads is accommodated by a slight deflection of whichever leaf spring is being operated by the roller 74. Thus the mounting plate will not only be accelerated downward by the hammer blows, but will also accelerate in the reverse direction from the rebound force of the gasket followed by a sudden termination of rebound by the bolts 60.

The bi-directional periodic accelerations of the plate 58 and hence the filter elements 57 is effective in shaking off the accumulated dust and filter cake, especially when imparted to filters of the type described because of their axial rigidity. Also, the pleated filter surfaces extend vertically and hence do not interfere with the free fall of the loosened dust and filter cake. Although the impulse filter cleaning mechanism FC has special effectiveness when cleaning the vertical pleated filter elements 57, it is useful for cleaning other rigid or semi-rigid filters which have vertically disposed filter surfaces.

MODIFIED FORM

The sweeper vehicle 10 (FIGS. 1 and 2) employs four transversely extending rows of eleven filter elements 57, with two rows of filter elements at each side of the rock shaft 80. In a smaller capacity filter system, such as one employing only two rows of filter elements, the same advantages of the impulse filter cleaning mechanism FC can be achieved with a modified form of the invention shown in FIGS. 6 and 7.

The impulse filter cleaning mechanism FC' (FIGS. 6 and 7) is essentially half of the first disclosed system, in that the rock shaft 80a extends along one side of a single double row of filter elements 57 and only rearwardly projecting rocker arms 90a are employed. The filtered air compartment 50a is bounded by forward and rearward walls 100 and 102, but the general arrangement for air flow through the walls of the filters and into the filtered air chamber 50a is the same as the system earlier described. Thus, there is provided a horizontal filter support plate 58a which is held by bolts 60a atop a resilient gasket 56a. The gasket rests on flanges 46a as before. An end wall 104 drops vertically and then extends laterally to provide a floor panel 106 so that the mechanism for driving the rocker arm 80a is isolated from the dust environment of the subjacent hopper H.

One end portion of the rock shaft 80a is supported by a bearing 108 (FIG. 6) which is secured to a flange portion 109 of a bracket 110 that has another flange portion 111 fixed to the wall 100. The resilient crank arm C' has a split clamping block 86a mounting cantilever leaf springs 87a, 88a as previously described. A camming roller 74a rides between the leaf springs as before, but in the present instance, the bolt 75a retains the roller 74a on an eccentric stub shaft 72a, which is directly secured to a driven pulley 112, and is displaced from the turning axis 113 of the pulley such that the periphery of the roller 74a follows the circular path 76a (FIG. 7). The pulley 112 has a hub 114 (FIG. 6) secured to a shaft 115 that is mounted in a bearing 116 welded to another flange portion 117 of the bracket 110. The shaft 115 is retained by a collar 118.

The pulley 112 is driven by a motor M3 having one end mounted on the flange portion 117 and having a drive pulley 120 shown in phantom in FIG. 7. The motor pulley 120 drives the roller mounting pulley 112 by a V-belt 122. The pulley 112 is rotated at a speed resulting in the delivery of 600 hammer blows per minute to one double row of filters, as was earlier described for the double rocker arm system.

Assuming that roller 74a follows the CW path in the direction of arrow 77a, the hammer heads 92a prevent the further CW rotation of the rock shaft 80a after the hammer heads have delivered their blows to the mounting plate 58a. The lower leaf spring 88a is then deflected by the roller as it completes its down stroke, as before. The roller 74a moves upwardly after termination of its downward stroke relative to the springs 87a, 88a and lifts and accelerates the rocker arms 90a and hammer heads 92a by acting against the upper leaf spring 87a. Thus, due to the momentum of the rising parts, when the roller 74a has lifted the rocker arms 90a to their highest position by flexing the upper leaf spring 87a, the single row of rocker arms tend to continue rising due to their momentum because there are no opposed rocker arms to arrest their rise, as in the double row form of the invention. Thus if reliance were placed on the roller 74a (FIG. 7) to check the rise this action would be accompanied by flexing of the lower leaf springs 88a. Not only would this result in flexing of that spring sufficiently to absorb the kinetic energy of the rising row of rocker arms and hammer heads, but when the roller 74a reversed for its down stroke, it would change the direction of the rocker arms and re-accelerate them in the downward direction. Thus, if nothing more were done, the resultant major deflection and stress reversal experienced by the lower spring 88a would fatigue the metal (spring steel) of the spring and it would undergo stress failure.

To eliminate the foregoing problems, a positive mechanical stop is provided for checking the rise of the rocker arms 90a. The flange 109 (FIG. 6) of the bracket 110 is provided with a stop leg 124 which extends parallel to the rocker arm shaft 80a. Depending from and fixed to the rocker arm shaft 80a is a stop lever 126, provided with an edge portion 128 (FIG. 7) which will contact the opposed face of stop leg 124 when the camming roller 74a approaches top dead center along the path 76a, at which time the row of rocker arms 90a have been accelerated and are rising. Thus, rise of the rocker arms 90a is arrested by the stop lever 126 instead of by the lower spring 88a and the momentum of the rocker arm assembly cannot overflex the lower leaf spring 88a. Similarly, when the camming roller 74a moves downward, it starts the row of arms 90a down from a stationary position instead of being forced to reverse their direction, as would be the case if no stop structure were provided because the stop leg and stop lever 124,126, have already cooperatively brought the rocker arms 90a to a stop.

In summary of the foregoing description, the impulse filter cleaning mechanism FC or FC' has proven that large forces and motion are not necesssary to effectively clean filters and that what is required, is a sudden rap that is mechanically imparted to the hammers as opposed to gravity fall thereof. The resultant impulse force transmitted to the filter causes a rapid downward acceleration motion to the filter elements which effectively frees the dirt from the filters. To take advantage of this impulse force the whole filter assembly is resiliently mounted on a rubber gasket to accommodate a small downward movement of the assembly as well as to provide a continuous seal between the filtered and unfiltered air chambers above and below the filter bank. By using multiple hammer heads to cause the filter elements and filter mounting plate to move as one unit, all parts of the filter elements are subject to the sudden motion necessary for cleaning. At the same time, no twisting or side force is imposed on the filters to cause fatigue breakdown of the filters. By suspending the filters vertically, and using a vertical impulse force as described, the dirt is readily separated to drop into the collection chamber. Instantaneous deformation of the sealing gaskets 56 or 56a by the hammer blows is immediately followed by self restoration of the gaskets to their original thickness. This rebound action raps the filter support plates 58 or 58a against the confining heads of bolts 60,60a so that a second jar is imparted to the filter elements immediately after they have received a jar from the hammers. The upper leaf springs 87a do not substantially diminish the effectiveness of this second or rebound jar in providing another effective dirt dislodging rap to the filter support plate. Preferably, the rocker arm assembly includes a row of rocker arms 90 or 90a for cleaning rows of filters, in which case all of the hammer heads on one side of the rocker arm assembly are adjusted to strike the filter support plate simultaneously. Preferably, the means are provided to shut off the normal air flow through the filter elements during the cleaning operation the air that normally flows through the filters tends to hold the dust and dirt against the outer surface of the filters which reduces the cleaning effect of the hammer and rebound blows provided by the cleaning system.

Although the best mode contemplated for carrying out the present invention has been herein shown and described, it will be apparent that modification and variation may be made without departing from what is regarded to be the subject matter of the invention.

We claim:

1. In an apparatus for cleaning dust filters comprising frame structure, a filter support, means for resiliently mounting said support on said frame structure, dust filters depending from said support, said cleaning apparatus comprising a rocker arm, means for pivotally supporting said rocker arm on said frame structure, a hammer head mounted on said rocker arm in spaced relation to said pivot means and means for operating said rocker arm to cause said hammer head to strike the filter support; the improvement wherein said operating means comprises resilient crank arm means having one end portion operatively connected to said rocker arm pivot means for oscillating the arm about its pivot, oscillating means having a predetermined stroke and engaging the other end portion of said resilient crank arm means, means for driving said oscillating means, the stroke of said oscillating means in one direction acting on said resilient crank arm means, to cause said hammer head to strike said filter support, the complete stroke of said oscillating means in said one direction exceeding the stroke motion required to cause the hammer head to strike the support so that the striking force imparted by said oscillating means continues right up to the time of strike, said resilient crank arm means deflecting during the terminal portion of said complete stroke thereby accommodating completion of the stroke while motion of said hammer head remains interrupted by said filter support, and said oscillating means further including means for retracting said hammer head from said support during the stroke of said oscillating means in the opposite direction.

2. The apparatus of claim 1, wherein said filters are vertically elongate and axially rigid, and wherein said filter support comprises a flat, apertured filter support mounting plate with one of said filters suspended from said plate at each aperture; said frame structure comprising a rigid flange underlying the marginal edge portions of said filter support plate; and a resilient rubber-like gasket in sealing engagement with the underside of said support plate and the upper surface of said rigid flange, said gasket being deformable by the impact of said hammer due to the resiliency of said gasket with a resultant downward placement of said support plate and means for firmly checking the rebound of said plate after it has received a hammer blow.

3. In an apparatus for cleaning suspended dust filters by impacting the support means for the filters with an oscillating hammer head, the improvement comprising;
 a. a resiliently supported mounting plate suspending said dust filters;
 b. a rock shaft extending over said mounting plate;
 c. a rocker arm connected to and projecting in one direction from said rock shaft, said arm having a hammer head for striking said support plate adjacent said filters;
 d. a resilient crank arm mounted on said rock shaft and comprising a pair of projecting spaced leaf springs mounted in cantilever fasion on said rock shaft;
 e. a driven shaft adjacent said leaf springs and means for driving said shaft;
 f. a roller located between the free ends of said leaf springs and means mounting said roller eccentrically on said shaft to oscillate said shaft, the throw of said roller exceeding that which is required to impact said hammer head against said support plate so that the terminal portion of the roller stroke flexes said leaf springs after the plate has interrupted downward motion of the hammer head; and
 g. means for limiting movement of said hammer head in a direction away from said mounting plate.

4. The apparatus of claim 3, wherein said limiting means comprises a second rocker arm projecting from said rock shaft in a direction opposiite to that of said first named rocker arm, and a hammer head mounted on said second rocker arm, the stroke of said roller also exceeding that which is required to impact said second hammer head against said filter support plate.

5. The apparatus of claim 3, wherein said limiting means comprises a stop arm connected to said rock shaft, and a fixed abutment contacted by said stop arm to limit the movement of said hammer head away from said mounting plate.

6. The apparatus of claim 3, wherein said rock shaft and said rocker arm are of tubular construction to minimize their inertia.

7. The apparatus of claim 3, wherein said means for driving said driven shaft drives the shaft at a speed resulting in about 600 impacts per minute of each of said hammer head against said filter support plate.

8. The apparatus of claim 3, wherein said resilient crank arm also comprises a clamp block, means for clamping said block in a preselected position on said rock shaft, and means for mounting said leaf springs on said clamp block.

9. The apparatus of claim 3, comprising a row of said rocker arms and associated hammer heads mounted in spaced relation along said rock shaft.

10. The apparatus of claim 9, comprising means for adjustably positioning said hammer heads on their associated rocker arms so that all hammer heads strike said filter support plate substantially simultaneously.

* * * * *